United States Patent [19]
Fujii et al.

[11] Patent Number: 5,700,437
[45] Date of Patent: Dec. 23, 1997

[54] METHOD FOR REMOVING CARBON DIOXIDE FROM COMBUSTION EXHAUST GAS

[75] Inventors: Masumi Fujii; Taiichiro Suda; Yoshitsugu Hotta; Koichi Kitamura; Yukihiro Jinno; Tomio Mimura; Shigeru Shimojo, all of Osaka; Masaki Iijima, Tokyo; Shigeaki Mitsuoka, Hiroshima, all of Japan

[73] Assignees: The Kansai Electric Power Co., Inc., Osaka; Mitsubishi Jukogyo Kabushiki Kaisha, Tokyo, both of Japan

[21] Appl. No.: 660,837

[22] Filed: Jun. 10, 1996

Related U.S. Application Data

[63] Continuation of Ser. No. 317,745, Oct. 4, 1994, abandoned.

[30] Foreign Application Priority Data

Oct. 6, 1993 [JP] Japan .................. 5-250417
Mar. 9, 1994 [JP] Japan .................. 6-038265

[51] Int. Cl.$^6$ .................................................. B01D 53/62
[52] U.S. Cl. .................................. 423/220; 423/228
[58] Field of Search ........................ 423/220, 228, 423/229; 95/236

[56] References Cited

U.S. PATENT DOCUMENTS

| | | | |
|---|---|---|---|
| 3,622,267 | 11/1971 | Bartholome et al. | 23/2 R |
| 3,856,921 | 12/1974 | Shrier et al. | 423/228 |
| 4,096,085 | 6/1978 | Holoman, Jr. et al. | 252/189 |
| 4,100,257 | 7/1978 | Sartori | 423/226 |
| 4,101,633 | 7/1978 | Sartori et al. | 423/228 |
| 4,217,236 | 8/1980 | Sartori | 252/189 |
| 4,217,237 | 8/1980 | Sartori | 252/192 |
| 4,217,238 | 8/1980 | Sartori et al. | 252/192 |
| 4,240,922 | 12/1980 | Sartori et al. | 252/189 |
| 4,240,923 | 12/1980 | Sartori et al. | 252/189 |
| 4,336,233 | 6/1982 | Apple et al. | 423/228 |
| 4,372,873 | 2/1983 | Nieh | 252/389 R |
| 4,581,209 | 4/1986 | Oswald et al. | 423/223 |

FOREIGN PATENT DOCUMENTS

| | | |
|---|---|---|
| 0348251 A1 | 12/1989 | European Pat. Off. . |
| 0558019 A2 | 9/1993 | European Pat. Off. . |
| 0558019 A3 | 9/1993 | European Pat. Off. . |
| 2332049 A2 | 6/1977 | France . |
| 1 542 415 | 4/1970 | Germany . |
| 1 904 428 | 8/1970 | Germany . |
| 52-63171 | 5/1977 | Japan . |
| 53-100180 | 9/1978 | Japan . |
| 61-71819 | 4/1986 | Japan . |
| 6198120 | 7/1994 | Japan ............ 95/236 |
| 8911327 | 11/1989 | WIPO ............ 423/229 |

OTHER PUBLICATIONS

Chemical Engineering Science, vol. 41, No. 4, pp. 405–408 and pp. 997–1003 1986 no month.

*Primary Examiner*—Gary P. Straub
*Assistant Examiner*—Timothy C. Vanoy
*Attorney, Agent, or Firm*—Jacobson, Price, Holman & Stern, PLLC

[57] ABSTRACT

A method for removing carbon dioxide from a combustion exhaust gas under atmospheric pressure by the use of a mixed solution of a specific amine compound X having an alcoholic hydroxyl group and a primary amino group which is bonded to a tertiary carbon atom having two unsubstituted alkyl groups and another amine compound Y being a diaminotoluene (DAT) selected from the group consisting of 2,3-DAT, 2,4-DAT, 2,5-DAT, 2,6-DAT, 3,4-DAT and 3,5-DAT.

5 Claims, 1 Drawing Sheet

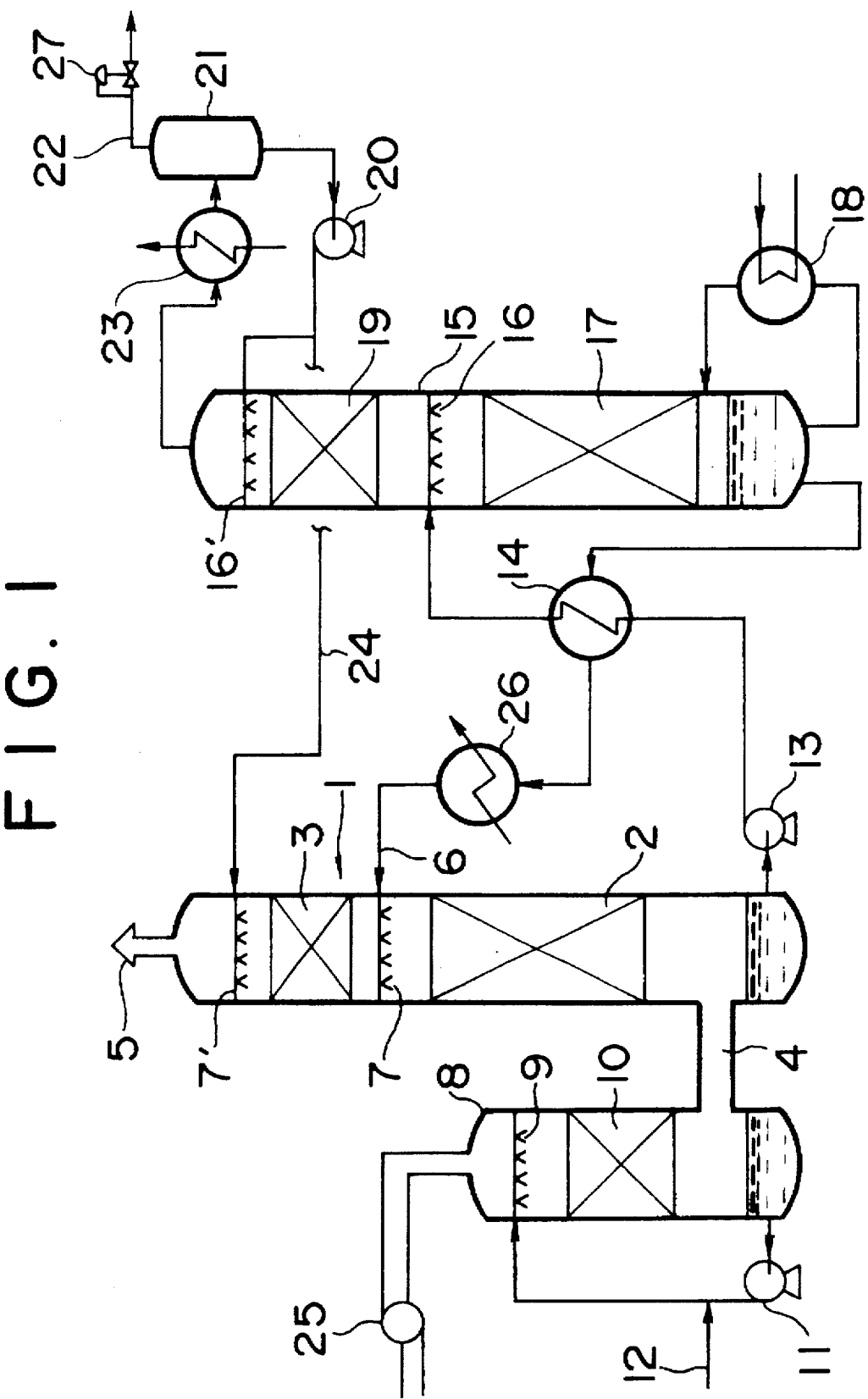
FIG. I

METHOD FOR REMOVING CARBON DIOXIDE FROM COMBUSTION EXHAUST GAS

This is a continuation of application Ser. No. 08/317,745 filed Oct. 4, 1994, which is now abandoned.

BACKGROUND OF THE INVENTION

1. Field of the Invention

The present invention relates to a method for removing $CO_2$ (carbon dioxide) from a combustion exhaust gas, and more specifically, it relates to a method for efficiently removing $CO_2$ from a combustion exhaust gas under atmospheric pressure by the use of a mixed aqueous solution of specific amines.

2. Description of the Related Art

In recent years, the greenhouse effect of $CO_2$ has been noted as one cause of the global warming, and prompt efforts against it have gathered an international attention in order to protect the earth environment. Sources of $CO_2$ release are found in all human activities in which fossil fuel is burned, and the restriction requirements and regulations on the $CO_2$ release are being further tightened. Thus, for power generation facilities such as thermoelectric power plants in which a large amount of fossil fuel is used, methods have been studied for removing and collecting $CO_2$ from combustion exhaust gases by bringing the combustion exhaust gas from a boiler into contact with an aqueous alkanolamine solution or the like, and also methods for storing the collected $CO_2$ without discharging it into the atmosphere have been studied intensively.

Examples of such alkanolamine include monoethanolamine, diethanolamine, triethanolamine, methyldiethanolamine, diisopropanolamine and diglycolamine, and in general, monoethanolamine (MEA) is preferably used. However, even if the above-mentioned aqueous alkanolamine solution typified by MEA is used as an absorbing solution for absorbing/removing $CO_2$ from a combustion exhaust gas, the use of such alkanolamine is not always satisfactory in view of such problems as an amount of absorbed $CO_2$ per unit amount of the aqueous amine solution having a given concentration, an amount of absorbed $CO_2$ per unit mole of amine in the aqueous amine solution having a given concentration, an absorption rate of $CO_2$ at a given concentration, heat energy required to regenerate the aqueous alkanolamine solution after the absorption, and the like.

For the separation of an acidic gas from various mixed gases by the use of an amine compound, many techniques are already known.

Japanese Patent Provisional Publication No. 100180/1978 discloses a method for removing an acidic gas which includes bringing a mixture which is normally gaseous into contact with an amine-solvent liquid absorbent comprising: (1) an amine mixture comprising at least 50 mole % of a sterically hindered amine having at least one secondary amino group which is a part of a ring and bonded to either of a secondary carbon atom or a tertiary carbon atom or a primary amino group bonded to a tertiary carbon atom, and at least about 10 mole % of a tertiary amino-alcohol; and (2) a solvent for the above-mentioned amine mixture which is a physical absorbent for the acidic gas. Examples of the usable sterically hindered amine include 2-piperidine ethanol [or 2-(2-hydroxyethyl)-piperidine] and 3-amino-3-methyl-1-butanol, and an example of the solvent is a sulfoxide compound which may contain water in an amount of 25% by weight or less. Furthermore, as an example of a gas to be treated, reference is made to "a usually gaseous mixture containing carbon dioxide and hydrogen sulfide at high concentrations, for example, 35% of $CO_2$ and 10–12% of $H_2S$" on page 11, left upper column of this publication. In examples, $CO_2$ itself is used.

In Japanese Patent Provisional Publication No. 71819/1986, a composition for the scraping of an acidic gas which contains a non-aqueous solvent such as a sterically hindered amine or sulfolane is described. As an example of the primary monoamino alcohol with steric hindrance, 2-amino-2-methyl-1-propanol (AMP) is mentioned and used. In examples, $CO_2$ and nitrogen or $CO_2$ and helium were used. Furthermore, as the absorbent, an aqueous solution of an amine and potassium carbonate or the like is used. Water is also used. In addition, this publication describes the advantage of the sterically hindered amine for the absorption of $CO_2$, showing reaction equations.

In Chemical Engineering Science, Vol. 41, No. 4, pp. 997–1003, a carbon dioxide gas absorption behavior of an aqueous solution of 2-amino-2-methyl-1-propanol (AMP), which is a hindered amine, is described. As gases which underwent the absorption treatment, $CO_2$ as well as a mixture of $CO_2$ and nitrogen were used at atmospheric pressure.

In Chemical Engineering Science, Vol. 41, No. 4, pp. 405–408, a report is made on the absorption rates for an aqueous solution of a hindered amine such as AMP and an aqueous solution of a straight-chain amine such as MEA to $CO_2$ and $H_2S$ near room temperature. According to this report, a large difference was not found between the two types of aqueous solutions when the partial pressure of $CO_2$ is 1 atm and the concentrations of the aqueous solutions are 0.1–0.3 mole. When the concentrations of the aqueous solutions are 0.1 mole and the partial pressure of $CO_2$ is decreased from 1 atm to 0.5 and 0.05 atm, however, the absorption rate of AMP deteriorates more largely than that of MEA at 0.05 atm.

U.S. Pat. No. 3,622,267 discloses a technique in which an aqueous mixture containing methyldiethanolamine and monoethylmonoethanolamine is used to purify a synthetic gas, such as a partially oxidized gas of a crude oil, containing $CO_2$ at a high partial pressure, for example, at 30% of $CO_2$ under 40 atm.

German Patent Publication No. 1,542,415 discloses a technique in which a monoalkylalkanolamine or the like is added to a physical or chemical absorbent in order to improve the absorption rate of $CO_2$, $H_2S$ and COS. Similarly, German Patent Publication No. 1,904,428 discloses the addition of monomethylethanolamine for the purpose of improving the absorption rate of methyldiethanolamine.

U.S. Pat. No. 4,336,233 discloses a technique for the purification of natural gas, synthetic gas or gasified coal gas in which a 0.81–1.3 mole/liter aqueous piperazine solution is used as a wash liquid, or piperazine is used in the state of an aqueous solution together with such a solvent as methyldiethanolamine, triethanolamine, diethanolamine or monomethylethanolamine as a wash liquid.

Similarly, Japanese Patent Provisional Publication No. 63171/1977 discloses a $CO_2$ absorbent obtained by adding piperazine or a piperazine derivative, such as hydroxyethylpiperazine, as an accelerator to a tertiary alkanolamine, a monoalkylalkanolamine or the like.

As described above, a method for efficiently removing $CO_2$ from combustion exhaust gases has been desired.

SUMMARY OF THE INVENTION

An object of the present invention is, when treating a combustion exhaust gas with an aqueous solution containing a $CO_2$ absorbent (an amine compound) at a certain concentration, to provide a method for removing $CO_2$ by the use of an absorbent which is capable of absorbing a large amount of $CO_2$ per unit mole of the absorbent and absorbing a large amount of $CO_2$ per unit volume of the aqueous solution and which has a high absorption rate.

Another object of the present invention is to provide a method for removing $CO_2$ by the use of an absorbent which requires smaller amounts of heat energy in order to separate $CO_2$ and thereby regenerate the absorbing solution after the absorption of $CO_2$. An object of the present invention is, in particular, to improve the absorption rate of the absorbent which conventionally has a large $CO_2$ absorption capacity but shows a low absorption rate.

The present inventors have intensively investigated an absorbent for use in the removal of $CO_2$ from a combustion exhaust gas. As a result, they found that the employment of a mixture obtained by adding a relatively small amount of a specific amine compound Y to another specific amine compound X is particularly effective to improve the absorption rate of amine compound X. The present invention has been made on the basis of this finding.

That is to say, a first aspect of the present invention is directed to a method for removing $CO_2$ from a combustion exhaust gas which comprises the step of bringing the combustion exhaust gas under atmospheric pressure into contact with a mixed aqueous solution of 100 parts by weight of amine compound X and 1 to 25 parts by weight of amine compound Y; said amine compound X having one alcoholic hydroxyl group and a tertiary amino group, at least one group bonded to the tertiary amino group having a chain of two or more carbon atoms inclusive of its bonding carbon atom, two of the groups bonded to the tertiary amino group being unsubstituted lower alkyl groups; said amine compound Y being selected from the group consisting of (A) ethyleneamines (excluding ethylenediamine), (B) amines represented by a general formula $R^1(CH_2NH_2)_2$, where $R^1$ is a methylene chain of 1 to 5 carbon atoms which may be substituted by a lower alkyl group, (C) amines represented by $NH_m[(CH_2)_nNH_2]_{3-m}$, where m is 1 or 0, and n is 2 or 3, (D) piperazine compounds represented by Pip—$R_2$—$NH_2$, where Pip is a piperazinyl group, and $R^2$ is a methylene chain of 1 to 4 carbon atoms which may be substituted by a lower alkyl group, (E) compounds having one alcoholic hydroxyl group, and having a secondary amino group having a nitrogen atom bonded to an unsubstituted alkyl group of 4 or less carbon atoms and to a group having a chain of 2 or more carbon atoms inclusive of a bonding carbon atom, and (F) homopiperazine.

In the present invention, the $CO_2$ absorption rate of the amine compound X can be effectively accelerated by using a combination of the amine compound X and a relatively small amount of the amine compound Y. The amine compound Y can be used singly, or two or more of the amine compounds Y can be combined and then mixed with the amine compound X.

In the amine compound X used in the first aspect of the present invention having one alcoholic hydroxyl group and a tertiary amino group in which at least one group bonded to the tertiary amino group is a chain of two or more carbon atoms inclusive of its bonding carbon atom and two of the groups bonded to the tertiary amino group are unsubstituted lower alkyl groups, these two unsubstituted lower alkyl groups may be the same or different, and examples of the unsubstituted lower alkyl groups include a methyl group, an ethyl group, a propyl group and an isopropyl group. Preferable examples of the amine compound X include 2-(dimethylamino)-ethanol, 2-(diethylamino)-ethanol (DEAE), 2-(ethylmethylamino)-ethanol, 1-(dimethylamino)-ethanol, 1-(diethylamino)-ethanol, 1-(ethylmethylamino)-ethanol, 3-dimethylamino-1-propanol, 4-dimethylamino-1-butanol and 2-dimethylamino-2-methyl-1-propanol, and DEAE is particularly preferable.

Of the amine compound Y which can be used in the first aspect of the present invention, examples of ethyleneamines (A) include diethylenetriamine, triethylenetetramine (TETA) and tetraethylenepentamine (TEPA).

In the amine compound Y, as to amines (B) represented by the general formula $R^1(CH_2NH_2)_2$, $R^1$ is a methylene chain of 1 to 5 carbon atoms which may be substituted by a lower alkyl group. Preferable examples of this lower alkyl group include a methyl group, an ethyl group and a propyl group having 1 to 3 carbon atoms. Examples of the amines (B) include 2,2-dimethyl-1,3-diaminopropane (DMDAP), hexamethylenediamine (HMDA) and 1,4-diaminobutane (DAB).

In the amine compound Y, as to amines (C) represented by $NH_m[(CH_2)_nNH_2]_{3-m}$, where m is 1 or 0 and n is 2 or 3, and preferable examples of the amine (C) include 3,3-iminobispropylamine (IBPA) and tris(2-aminoethyl)amine (TAEA).

In the amine compound Y, as for piperazine compounds (D) represented by Pip—$R^2$—$NH_2$, as the methylene chain having 1 to 4 carbon atoms represented by $R^2$, a methylene chain having 1 or 2 carbon atoms is preferable. Examples of a lower alkyl group which is a substituent of the methylene chain include the same groups as those mentioned for $R^1$. A preferable example of the piperazine compound (D) is N-(2-aminoethyl)piperazine (AEP).

In the amine compound Y, as to the compounds (E) each having one alcoholic hydroxyl group and having a secondary amino group having a nitrogen atom bonded to an unsubstituted alkyl group of 4 or less carbon atoms and a group having a chain of 2 or more carbon atoms inclusive of a bonding carbon atom, examples of the unsubstituted alkyl group of 4 or less carbon atoms include a methyl group, an ethyl group, a propyl group and a butyl group, and the propyl group and the butyl group may be branched. Furthermore, as the chain of 2 or more carbon atoms, a chain having 2 to 3 carbon atoms is preferable. Examples of the compounds (E) include 2-(ethylamino)-ethanol, 2-(methylamino)ethanol, 2-(propylamino)-ethanol, 2-(isopropylamino)ethanol, 2-(n-butylamino)-ethanol, 2-(sec-butylamino)ethanol, 2-(i-butylamino)-ethanol, 2-(t-butylamino)ethanol, 1-(ethylamino)-ethanol, 1-(methylamino)ethanol, 1-(propylamino)-ethanol and 1-(isopropylamino)-ethanol, and above all, 2-(ethylamino)-ethanol (EAE), 2-(methylamino)-ethanol and 2-(n-butylamino)-ethanol are preferable.

As the amine compound Y which can be used in the first aspect of the present invention, there is also homopiperazine (HP) (F).

With regard to the mixing ratio of the amine compounds X and Y in the first aspect of the present invention, the ratio of the amine compound Y is in the range of 1 to 25 parts by weight, preferably 1 to 10 parts by weight, against 100 parts by weight of the amine compound X. The concentration of the amine compound X in the mixed aqueous solution (hereinafter referred to also as "absorbing solution") is usually in the range of 15 to 65% by weight. At the time of the contact with combustion exhaust gas, the temperature of the mixed aqueous solution is usually in the range of 30° to 70° C. Furthermore, to the mixed aqueous solution which can be used in the present invention, a corrosion inhibitor, a deterioration inhibitor and the like can be added, if necessary.

Moreover, the expression "under atmospheric pressure" in the present invention covers a pressure range in the vicinity of the atmospheric pressure which can result from the use of a blower or the like for feeding the combustion exhaust gas.

Next, reference will be made to a method for removing carbon dioxide from the combustion exhaust gas in accordance with a second aspect of the present invention.

That is to say, the second aspect of the present invention is directed to a method for removing $CO_2$ from a combustion exhaust gas which comprises the step of bringing the combustion exhaust gas under atmospheric pressure into contact with a mixed aqueous solution of 100 parts by weight of amine compound X and 1 to 25 parts by weight of amine compound Y; said amine compound X having an alcoholic hydroxyl group and a primary amino group bonded to a tertiary carbon atom having two unsubstituted alkyl groups; said amine compound Y being selected from the group consisting of (A) ethyleneamines excluding ethylenediamine, (B) iminobispropylamine (IBPA), (C) diaminotoluenes, (D) amines represented by a general formula $R^1(CH_2NH_2)_2$, where $R^1$ is a methylene chain of 1 to 5 carbon atoms which may be substituted by a lower alkyl group, (E) piperazine compounds represented by Pip—$R^2$—$NH_2$, where Pip is a piperazinyl group, and $R^2$ is a methylene chain of 1 to 4 carbon atoms which may be substituted by a lower alkyl group, and (F) homopiperazine.

According to the second aspect of the present invention, the $CO_2$ absorption rate of the amine compound X can be effectively accelerated by using a combination of the amine compound X and a relatively small amount of the amine compound Y as mentioned above. The amine compound Y can be used singly, or two or more of the amine compounds Y can be combined and then mixed with the amine compound X.

In the above-mentioned amine compound X having one alcoholic hydroxyl group and a primary amino group bonded to a tertiary carbon atom having two unsubstituted alkyl groups which can be used in the second aspect of the present invention, these unsubstituted alkyl groups may be the same or different, and examples of the alkyl groups include a methyl group, an ethyl group and a propyl group, but both of the two unsubstituted alkyl groups are preferably the methyl groups. Examples of the amine compound X include 2-amino-2-methyl-1-propanol (AMP), 3-amino-3-methyl-2-pentanol, 2,3-dimethyl-3-amino-1-butanol, 2-amino-2-ethyl-1-butanol, 2-amino-2-methyl-3-pentanol, 2-amino-2-methyl-1-butanol, 3-amino-3-methyl-1-butanol, 3-amino-3-methyl-2-butanol, 2-amino-2,3-dimethyl-3-butanol, 2-amino-2,3-dimethyl-1-butanol and 2-amino-2-methyl-1-pentanol, and above all, AMP is preferable.

In the amine compound Y which can be used in the second aspect of the present invention, examples of the ethyleneamines (A) include diethylenetriamine, triethylenetetramine (TETA) and tetraethylenepentamine (TEPA).

Examples of diaminotoluenes (DAT) (C) which can be used in the second aspect of the present invention include 2,3-DAT, 2,4-DAT, 2,5-DAT, 2,6-DAT, 3,4-DAT and 3,5-DAT.

In amines (D) represented by a general formula $R^1(CH_2NH_2)_2$ which can be used in the second aspect of the present invention, $R^1$ is a methylene chain of 1 to 5 carbon atoms which may be substituted by a lower alkyl group. Preferable examples of this lower alkyl group include a methyl group, an ethyl group and a propyl group having 1 to 3 carbon atoms. Examples of the preferable compound include 2,2-dimethyl-1,3-diaminopropane (DMDAP) and hexamethylenediamine (HMDA).

In the piperazine compound (E) represented by Pip—$R^2$—$NH_2$ which can be used in the second aspect of the present invention, as the methylene chain of 1 to 4 carbon atoms, a methylene chain having 1 to 2 carbon atoms is preferable. As the lower alkyl group which is a substituent to this methylene chain, the compounds mentioned above in the case of $R^1$ can be used. A suitable example of the piperazine compound (E) is N-(2-aminoethyl)piperazine (AEP).

With regard to a mixing ratio of the amine compounds X and Y in the second aspect of the present invention, the ratio of the amine compound Y is in the range of 1 to 25 parts by weight, preferably 1 to 10 parts by weight, more preferably 1 to 6 parts by weight against 100 parts by weight of the amine compound X.

The concentration of the amine compound X in the mixed aqueous solution (hereinafter referred to also as "absorbing solution") is usually in the range of 15 to 65% by weight. At the time of the contact with combustion exhaust gas, the temperature of the mixed aqueous solution is usually in the range of 30° to 70° C. Furthermore, to the mixed aqueous solution which can be used in the present invention, a corrosion inhibitor, a deterioration inhibitor and the like can be added, if necessary. Moreover, the expression "under atmospheric pressure" in the present invention covers a pressure range in the vicinity of the atmospheric pressure produced by a blower or the like for feeding the combustion exhaust gas.

BRIEF DESCRIPTION OF THE DRAWING

FIG. 1 is a diagram showing one example of a $CO_2$ removal process from a combustion exhaust gas which can be employed in the practice of a method of the present invention.

DETAILED DESCRIPTION OF THE PREFERRED EMBODIMENT

No particular restriction is put on a process which can be employed in a method for removing $CO_2$ from a combustion exhaust gas of the present invention, but one embodiment of the process will be described in reference to FIG. 1. In FIG. 1, only main parts are shown, and minor attachments are omitted.

In FIG. 1, reference numeral 1 indicates a $CO_2$ removing tower, 2 a lower filling portion, 3 an upper filling portion or a tray, 4 a combustion exhaust gas inlet of the $CO_2$ removing tower, 5 a combustion exhaust gas outlet of the $CO_2$ removing tower, 6 an absorbing solution inlet, 7 and 7' nozzles, 8 a combustion exhaust gas cooler which can be installed, if necessary, 9 a nozzle, 10 a filling portion, 11 is a moistening-cooling water circulating pump, 12 a replenishment water feed line, 13 an exhausting pump for the absorbing solution by which $CO_2$ has been absorbed, 14 a heat exchanger, 15 an absorbing solution regenerating tower (hereinafter referred to also as "regeneration tower"), 16 and 16' nozzles, 17 a lower filling portion, 18 a regeneration heater (reboiler), 19 an upper filling portion, 20 a reflux water pump, 21 a $CO_2$ separator, 22 an exhausting line for the collected $CO_2$, 23 a regeneration tower reflux condenser, 24 a regeneration tower reflux water feed line, 25 a combustion exhaust gas feed blower, 26 a cooler, and 27 a pressure control valve.

In FIG. 1, the combustion exhaust gas is fed to the combustion exhaust gas cooler by the combustion exhaust gas feed blower 25, and in the filling portion 10, the gas is then brought into contact with moistening-cooling water from the nozzle 9 to moisten and cool the gas. Then, the combustion exhaust gas is led to the $CO_2$ removing tower 1 through the exhaust gas inlet of the $CO_2$ removing tower. The moistening-cooling water which has been come into contact with the combustion exhaust gas is stored in the lower portion of the combustion exhaust gas cooler 8, and it is returned to the nozzle 9 by the moistening-cooling water circulating pump 11 and then used again. The moistening-cooling water is gradually lost while used to moisten and cool the combustion exhaust gas, and so it is replenished through the replenishment water feed line 12.

The combustion exhaust gas fed to the $CO_2$ removing tower 1 comes into counterflow contact with the absorbing solution having a certain concentration fed through the nozzle 7 in the lower filling portion 2, so that $CO_2$ in the combustion exhaust gas is absorbed by the absorbing solution, and the $CO_2$-free combustion exhaust gas is then delivered to the upper filling portion 3. The absorbing solution fed to the $CO_2$ removing tower 1 absorbs $CO_2$, and its temperature becomes higher than the temperature of the absorbing solution at the absorbing solution inlet 6 owing to reaction heat by this absorption. Subsequently, the absorbing solution is forwarded to the heat exchanger 14 by means of the exhausting pump 13 for the absorbing solution which has absorbed $CO_2$, heated therein, and then led to the regenerating tower 15. The temperature adjustment of the absorbing solution can be carried out by the heat exchanger 14 or, when required, the cooler 26 provided between the heat exchanger 14 and the absorbing solution inlet 6.

In the absorbing solution regenerating tower 15, the absorbing solution is regenerated in the lower filling portion 17 being heated by the regeneration heater 18, cooled by the heat exchanger 14, and then returned to the $CO_2$ removing tower 1. In the upper portion of the absorbing solution regenerating tower 15, $CO_2$ separated from the absorbing solution is brought into contact with reflux water fed through the nozzle 16' in the upper filling portion 19, cooled by the regeneration tower reflux condenser 23, separated from the reflux water formed by the condensation of water vapor accompanied with $CO_2$ by the $CO_2$ separator 21, and then led to a $CO_2$ recovery step through the exhausting line for the recovered $CO_2$. Most of the reflux water is returned to the regenerating tower 15 by the reflux water pump 20, and a part of the reflux water is delivered to a regeneration tower reflux water inlet 28 of the $CO_2$ removing tower 1 via the regeneration tower reflux water feed line 24. This regeneration tower reflux water contains a trace amount of the absorbing solution. Therefore, the regeneration tower reflux water is introduced into the upper filling portion 3 of the $CO_2$ removing tower 1 through the nozzle 7', and then brought into contact with the exhaust gas to contribute to the removal of a trace amount of $CO_2$ contained in the exhaust gas.

EXPERIMENTAL AND COMPARATIVE EXAMPLES

The first aspect of the present invention will be described in detail with reference to experimental examples.

Experimental Examples 1 to 9 and Comparative Example 1

In a glass reaction vessel arranged in a thermostatic chamber was placed 50 ml of a 30% aqueous solution of DEAE, and each of amine compounds Y described in Table 1 was added thereto in an amount of 1.5% by weight based on the weight of the above-mentioned DEAE aqueous solution. Next, a test gas was introduced into the thus prepared absorbing solution through a filter for bubble generation at a flow rate of 1 liter/minute under atmospheric pressure, while the absorbing solution was stirred at a temperature of 40° C. As the test gas, a model combustion exhaust gas having a composition of 10 mole % of $CO_2$, 3 mole % of $O_2$ and 87 mole % of $N_2$ at 40° C. was used.

The test gas was continuously introduced, and when $CO_2$ concentrations in the inlet and outlet gases were equal to each other, $CO_2$ contained in the absorbing solution was measured by the use of a $CO_2$ analyzer (a total organic carbon meter) to determine the amount of $CO_2$ saturated in the absorbing solution. Furthermore, at an early stage of the absorption test, a $CO_2$ concentration in the gas at the outlet of the reaction vessel (an outlet $CO_2$ initial concentration) was also measured. The lower this outlet $CO_2$ initial concentration was, the higher the $CO_2$ absorption rate of the absorbing solution was.

In Comparative Example 1, an absorption test using an absorbing solution comprising DEAE alone was carried out. The results of a saturated $CO_2$ absorption amount and an outlet $CO_2$ initial concentration are shown in Table 1.

It is apparent from the results of Experimental Examples 1 to 9 that the outlet $CO_2$ initial concentrations are more improved by the use of the absorbing solutions of the present invention than in the case of Comparative Example 1. In this connection, it was confirmed that the absorbing solution can be regenerated without any problem by heating the mixed solution which has undergone the absorption.

TABLE 1

| | Absorbing Solution | | Saturated $CO_2$ Absorption Amount | | |
|---|---|---|---|---|---|
| | Amine Compound X | Amine Compound Y | mols of $CO_2$/ mol of DEAE | $Nm^3$ of $CO_2$/ $m^3$ of Absorbing Solution | $CO_2$ Initial Conc. at Outlet (mol %) |
| Experimental Example 1 | DEAE | TEPA | 0.74 | 42.5 | 2.8 |
| Experimental Example 2 | DEAE | TEPA | 0.84 | 48.4 | 2.4 |
| Experimental Example 3 | DEAE | IBPA | 0.74 | 42.4 | 1.4 |
| Experimental Example 4 | DEAE | TAPA | 0.77 | 44.2 | 2.4 |
| Experimental Example 5 | DEAE | DAB | 0.81 | 46.4 | 2.4 |
| Experimental Example 6 | DEAE | DMDAP | 0.76 | 43.5 | 1.8 |
| Experimental Example 7 | DEAE | HMDA | 0.77 | 44.4 | 1.2 |
| Experimental Example 8 | DEAE | HP | 0.82 | 47.0 | 2.3 |
| Experimental Example 9 | DEAE | AEP | 0.77 | 44.0 | 1.0 |
| Experimental Example 10 | DEAE | EAE | 0.76 | 43.5 | 2.4 |
| Comparative Example 1 | DEAE | — | 0.77 | 44.3 | 5.4 |

As discussed above in detail, when a mixed aqueous solution of a specific amine compound X and another specific amine compound Y is used in combination as an absorbing solution for a combustion exhaust gas under atmospheric pressure in accordance with a method of the first aspect of the present invention, an absorption rate of $CO_2$ can be improved compared to cases where the amine compound X is used singly.

Next, the second aspect of the present invention will be described in detail with reference to experimental examples 10 to 18.

Experimental Examples 10 to 18 and Comparative Example 2

In a glass reaction vessel arranged in a thermostatic chamber was placed 50 ml of a 30% aqueous solution of AMP, and each of amine compounds Y described in Table 1 was added thereto in an amount of 1.5% by weight based on the weight of the above-mentioned AMP aqueous solution. Next, a test gas was introduced into the thus prepared absorbing solution at a flow rate of 1 liter/minute under atmospheric pressure, while the absorbing solution was stirred at a temperature of 40° C. As the test gas, there was used a model combustion exhaust gas having a composition of 10 mol % of $CO_2$, 3 mol % of $O_2$ and 87 mol % of $N_2$ at 40° C.

The test gas was continuously introduced, and when $CO_2$ concentrations in the inlet and outlet gases were equal to each other, $CO_2$ contained in the absorbing solution was measured by the use of a $CO_2$ analyzer (a total organic carbon meter) to determine a saturated $CO_2$ absorption amount. Furthermore, at an early stage of the absorption test, a $CO_2$ concentration in the gas at the outlet of the reaction vessel (an outlet $CO_2$ initial concentration) was also measured. The lower this outlet $CO_2$ initial concentration was, the higher the $CO_2$ absorption rate of the absorbing solution was.

In Comparative Example 2, an absorption test using an absorbing solution comprising AMP alone was carried out. The results of a saturated $CO_2$ absorption amount and an outlet $CO_2$ initial concentration are shown in Table 2.

It is apparent from the results of Experimental Examples 10 to 18 that the outlet $CO_2$ initial concentrations are improved by the use of the absorbing solutions of the present invention as compared to Comparative Example 2.

TABLE 2

| | Absorbing Solution | | Saturated $CO_2$ Absorption Amount | | |
|---|---|---|---|---|---|
| | Amine Compound X | Amine Compound Y | mols of $CO_2$/ mol of AMP | $Nm^3$ of $CO_2$/ $m^3$ of Absorbing Solution | $CO_2$ Initial Conc. at Outlet (mol %) |
| Experimental Example 10 | AMP | TEPA | 0.69 | 52.2 | 5.4 |
| Experimental Example 11 | AMP | TEPA | 0.65 | 49.1 | 6.0 |
| Experimental Example 12 | AMP | IBPA | 0.68 | 51.1 | 5.5 |
| Experimental Example 13 | AMP | 2,4-DAT | 0.56 | 42.3 | 6.1 |
| Experimental Example 14 | AMP | 3,4-DAT | 0.62 | 46.6 | 5.4 |

TABLE 2-continued

| | Absorbing Solution | | Saturated $CO_2$ Absorption Amount | | |
|---|---|---|---|---|---|
| | Amine Compound X | Amine Compound Y | mols of $CO_2$/ mol of AMP | $Nm^3$ of $CO_2$/ $m^3$ of Absorbing Solution | $CO_2$ Initial Conc. at Outlet (mol %) |
| Experimental Example 15 | AMP | DMDAP | 0.63 | 42.3 | 5.6 |
| Experimental Example 16 | AMP | HMDA | 0.63 | 47.5 | 5.8 |
| Experimental Example 17 | AMP | HP | 0.63 | 47.5 | 4.5 |
| Experimental Example 18 | AMP | AEP | 0.61 | 45.5 | 5.1 |
| Comparative Example 2 | AMP | — | 0.64 | 48.4 | 6.9 |

As discussed above in detail, when a mixed aqueous solution of a specific amine compound X and another specific amine compound Y is used as an absorbing solution for a combustion exhaust gas under atmospheric pressure in accordance with a method of the second aspect of the present invention, an absorption rate of $CO_2$ can be more improved than when the amine compound X is used singly.

We claim:

1. A method for removing carbon dioxide from a combustion exhaust gas comprising the steps of bringing the exhaust gas under atmospheric pressure into contact with a mixed aqueous solution of 100 parts by weight of an amine compound X and 1–25 parts by weight of an amine compound Y; said amine compound X having an alcoholic hydroxyl group and a primary amino group which is bonded to a tertiary carbon atom having two unsubstituted alkyl groups; said amine compound Y being a diaminotoluene (DAT) selected from the group consisting of 2,3-DAT, 2,4-DAT, 2,5-DAT, 2,6-DAT, 3,4-DAT and 3,5-DAT.

2. The method according to claim 1 wherein the amine compound X is a compound selected from the group consisting of 2-amino-2-methyl-1-propanol, 3-amino-3-methyl-2-pentanol, 2,3-dimethyl-3-amino-1-butanol, 2-amino-2-ethyl-1-butanol, 2-amino-2-methyl-3-pentanol, 2-amino-2-methyl-1-butanol, 3-amino-3-methyl-1-butanol, 3-amino-3-methyl-2-butanol, 2-amino-2,3-dimethyl-3-butanol, 2-amino-2,3-dimethyl-1-butanol, and 2-amino-2-methyl-1-pentanol.

3. The method according to claim 2 wherein the amine compound X is 2-amino-2-methyl-1-propanol.

4. The method according to claim 1 wherein a mixing ratio of the amine compound X to the amine compound Y is 100:1–10 in terms of parts by weight.

5. The method of claim 1 wherein the concentration of amine compound X in the mixed aqueous amine solution is in the range of 15–65% by weight.

* * * * *